US00RE38631E1

(19) United States
(12) Reissued Patent
Ruggiere, Sr. et al.

(10) Patent Number: US RE38,631 E
(45) Date of Reissued Patent: Oct. 19, 2004

(54) PAPERBOARD CONTAINER REINFORCING METHOD

(75) Inventors: Thomas S. Ruggiere, Sr., Athens, GA (US); Marvin A. Douda, Lexington, SC (US); Thomas S. Ruggiere, Jr., Athens, GA (US); John B. Weck, Lawrenceville, GA (US)

(73) Assignee: ConPac South, Inc., Athens, GA (US)

(21) Appl. No.: 10/166,832

(22) Filed: Jun. 11, 2002

Related U.S. Patent Documents

Reissue of:
(64) Patent No.: 6,074,331
Issued: Jun. 13, 2000
Appl. No.: 09/082,696
Filed: May 21, 1998

U.S. Applications:

(62) Division of application No. 08/638,960, filed on Apr. 24, 1996, now Pat. No. 5,772,108.

(51) Int. Cl.[7] ..... B31B 1/70
(52) U.S. Cl. ..... 493/89; 53/589
(58) Field of Search ..... 493/89, 136, 137, 493/84, 98, 178, 181, 957; 53/589, 590, 176

(56) References Cited

U.S. PATENT DOCUMENTS 4,166,569 A * 9/1979 Begnaud et al. ..... 229/122.33
4,219,149 A * 8/1980 Stark ..... 206/509
4,392,606 A * 7/1983 Fremion ..... 206/600
4,702,408 A * 10/1987 Powlenko ..... 229/101
4,769,970 A * 9/1988 Konno ..... 53/176
4,850,506 A * 7/1989 Heaps et al. ..... 229/117.3
4,870,807 A * 10/1989 Palamides et al. ..... 53/528
6,470,655 B1 * 10/2002 Schwede ..... 53/586

OTHER PUBLICATIONS

Friedman & Kipnees, Distribution Packaging, Krieger Publishing, pp. 431–441, 1977.*

* cited by examiner

*Primary Examiner*—Eugene Kim
(74) *Attorney, Agent, or Firm*—Allen, Dyer, Doppelt, Milbrath & Gilchrist, P.A.

(57) ABSTRACT

An octagonal container is formed from corrugated paperboard with overlapping flaps for eliminating gaps in the container bottom wall. Prestretched polypropylene straps are automatically applied to the container when in its flattened condition for providing girth support to the container when in its erected condition. The straps are positioned from the lower portion of the container side walls at ever increasing distances from each other for limiting container bulge when carrying products having varying effects on the container. With such an arrangement of straps, economically and environmentally desirable single and double wall corrugated paperboard can be used where typically triple wall and laminated paperboard containers are used.

26 Claims, 7 Drawing Sheets

PAPERBOARD CONTAINER REINFORCING METHOD

Matter enclosed in heavy brackets [ ] appears in the original patent but forms no part of this reissue specification; matter printed in italics indicates the additions made by reissue.

CROSS REFERENCE TO RELATED APPLICATION

This application is a divisional of application Ser. No. 08/638,960 filed Apr. 24, 1996, now U.S. Pat. No. 5,772,108, commonly owned with the present application.

BACKGROUND OF INVENTION

1. Field of Invention

The invention relates generally to collapsible containers constructed of paperboard material, and more particularly to reinforcing the container during the manufacturing process and before the container is erected.

2. Description of Background Art

Historically the bulk packaging and transport of certain products has been accomplished through the use of octagon bulk containers. The length and width of these containers are such that they fit a 40"×48" pallet with the depth of the container determined by the product packaged according to its weight. In addition, liner, medium and flute configuration of these containers is determined by the product being packaged, its weight and the resistance that the package must have to bulge and compression in order to maintain container integrity and shape during container transit. In addition to bulge resistance and in the case where containers are stacked two high during storage and transit, stacking compression required to support double stacking dictates the use of certain liner, medium and flute configurations.

By way of example, consider the use of octagon bulk containers in the poultry industry. This industry utilized basically two types of octagon bulk containers for shipment of chicken frames and bones and for shipment of mechanically deboned meat (MDM). The frames and bones left over from the processing of a chicken are typically shipped to an MDM processor. The bones are dumped into a "grinder" and along with addition of salt and other additives, the end product, a thick flowable meat, is produced and packed into an octagon bulk container for shipping. This product is sold and shipped to companies producing hot dogs, bologna, and other meat items with the MDM meat used as a "filler".

The octagon container used for shipment of the MDM meat is sized, typically 36"–40" deep, to accommodate 2,080 lbs. of this thick flowable meat. Because of the density of this product and the total weight in the bin, processors have typically placed 3–6 straps on the assembled container by hand, prior to filling. These straps are placed on the container to add resistance to bulge and to assist in preventing the container from rupturing at its glue joint, typically the place on a container subject to fail if not properly glued during manufacture. A fallacy in placing these straps exists, in that the strapping material typically used was not intended to resist bulge. Further, when applying the strap by hand, the friction seal typically used to connect the strapping material was not adequate for meeting the demands for preventing container rupture. In addition, the strap friction seal would break as well.

Further, by way of the example presented herein, the thick flowable meat (2,080 lbs.) has a tendency to have the products forming the flowable meat settle toward the bottom of the container, especially after being vibrated during transit. The greatest point of bulge would therefore occur within the bottom half of the container, thus pushing outward against container lower walls and straining the container glue joint. Typically container users, applying their own straps, are not aware that the straps should be placed at strategic intervals in order to provide the greatest resistance at the greatest points of bulge.

In order for the user to pre-apply their own straps to a container, typically they would have to unload a trailer truck of bulk containers shipped in the flat from container manufacturer and stage the unstrapped bulk in an area of their plant, a box room. Then an employee assembles a container in upright position, and using a hand tool, places 3–5 straps around the girth of an assembled container using whatever strapping material is available. The employee stages erected strapped containers in an area accessible to a packing line. The packing line comes to the staging area to secure container for filling.

It should also be noted that in the absence of a friction sealing hand tool, either metal or plastic buckles are typically used to secure the straps. In a food processing environment this introduces a potential hazard and contamination when one of the buckles inadvertently finds its way into the product.

The specification for a container typically requires a container having either triple wall (4 liners; 3 mediums) or laminated (double wall-to-double wall or double wall-to-single wall) construction. Use of these specifications afforded greater bulge resistance due to the actual thickness of combined corrugated materials. In either case, triple wall or laminated container construction, availability is limited due to a minimal amount of container plants having the manufacturing capability to produce containers to these specifications, and economically produce the container.

As described earlier, transport of frames and bones is accomplished through use of a octagon container. Performance requirements for this container are not as stringent as the above described container. When carrying 1200–1800 lbs. of wet frames and bones, which are not nearly as dense as various flowable meats, bulge is not as evident and in most cases straps do not have to be pre-applied for safer transit. What does remain critical to an even greater degree, however, is the performance of the glue joint. Unlike the previous container construction described and not having a plastic liner inserted in all cases as the previous product, the exposure to constant moisture from the bones, and oftentimes ice used during storage of the bones, requires that the glue joint be correctly manufactured. Should the glue joint on these containers rupture, an absolute mess is created that must literally be shoveled up by hand, leading to excess labor costs, disgruntled customers, disgruntled employees, and employees running the risk of injury.

The specifications for these containers typically require then relatively heavy liners and medium of double wall construction (3 liners; 2 mediums) to be impregnated with wax to resist the wet and moisture laden environment to which the container is subjected. Waxing precludes recycling and is neither ecologically nor economically sound.

Another requirement for each the previously described containers is the need for sesame tape. Approximately ⅜" wide, this tape is laminated between the liners and medium of the container during the combining process on a corrugator at a box plant. The placement of 5–8 strands of this tape throughout the depth adds a degree of bulge resistance to the container. If, however, the container ruptures at the glue joint, which is the most common failure, sesame tape does nothing to add to the integrity and safe transit of the packed and filled container.

Although[,] the octagon shape provides greater resistance to bulge over conventional rectangular or square containers, many octagonal containers do not meet the requirements demanded when used in the examples [as] cited above. For example, resistance to bulging may occur when flaps on the container bottom do not properly fit or when flaps having typically ⅜" wide slots, include slots with ragged edges due to dull slotting heads. Further, slots can vary in depth into the body of the container creating small openings or fall short of a score line causing tearing when folding. Both conditions weaken bulge resistance in corners of packed container.

SUMMARY OF INVENTION

It is an object of the invention to provide reinforcing of a paperboard container that will withstand the filling and handling when erected without the bulging and weakening that typically causes well known containers to fail, thus reducing user in-plant labor and material costs. It is further an object to provide a container that is reinforced with straps when in its flat condition. It is yet another object to automatically weld or heat seal the straps at strategic locations that are dependent on the product being packaged, the strapping positioned for providing the greatest degree of bulge resistance and compression value.

Further, it is an object to economically provide such reinforcement, thus eliminating the need for excess customer labor. It is anticipated that approximately 3–5 minutes per container typically required to friction seal straps by hand to an assembled container will be saved. The customer further saves by eliminating the need to purchase and inventory strapping material, hand equipment and maintenance parts. Areas previously used for container assembly, strapping and staging are also eliminated. With such objects met, the need for costly triple wall and laminated containers typically used because of the greater bulge resistance and stacking capability versus double wall will also be reduced. To this end, a reinforced paperboard container moveable from a [flatted] *flattened* condition to an erected condition is provided which comprises panels formed from a flat blank of corrugated paperboard scored to form multiple parallel panels joined to one another along adjacent sides. Each panel having a flap extending from an end in prolongation of the panel, each panel being foldable at its juncture with its associated flap and adjacent flaps being separated from one another by a slit, whereby the panels and flaps may be folded inwardly to one another for forming a hollow body having generally vertical side walls and multiple straps for providing girth support to the container, each strap positioned outside the container wall in a supporting arrangement therewith, each strap providing horizontal girth support at longitudinally spaced locations along the panels forming the container side walls.

In a preferred embodiment of the invention, the flaps at the panel ends overlay one another for forming a bottom wall free of gaps between the flaps. The spaced locations of the straps have a greater separation from an adjacent lower location when the container is in its erected position thus providing greater support at lower portions of the container. At least eight panels are joined for forming an octagonal container which provides a container having a supporting strength in excess of a rectangular container having similar paperboard construction. Further, a glue joint extends along attached end panels and associated flaps.

It is further an object of the invention to reinforce the container in an automatic manner which is capable of a production output at least as efficient as containers typically strapped. It is further an object to provide an economical method that has the flexibility of automatically attaching straps at predetermined locations. The method for reinforcing a paperboard container moveable from a flattened condition to an erected condition includes the steps of forming elongated paperboard into multiple parallel panels joined to one another along adjacent sides, positioning a slit between panel end portions for forming a flap extending from each panel end, folding the paperboard for attaching paperboard longitudinally opposing ends, and attaching the opposing ends. This forms the paperboard into a flattened container having side wall panels and associated flaps held in a flattened condition for ease in shipping and handling the containers prior to their use. The present invention further includes the steps of conveying the flattened container for placing a strap around the container for providing girth support to the container when in an erected condition, attaching a first strap under tension around the flattened container at a first selected location on the panels, the first selected location at a first distance from the flaps, incrementally advancing the flattened container for attaching a second strap, and attaching a second strap at a second selected location on the panels, the second selected location being at a distance from the first strap greater than the first distance.

In a preferred method, the container is further advanced, and additional straps are attached at additional selected locations. Each location is at a greater separation distance from a previously attached strap location.

The reinforcing provided to the container provides significant bulge resistance and as a result lighter weight liner grade specifications are permitted which has the obvious effect of reduced cost to the user. By way of example, single wall containers with straps effectively replace the more expensive double wall containers without straps thereby, thus reducing customer cost and improving financial margins.

BRIEF DESCRIPTION OF DRAWINGS

A preferred embodiment of the invention as well as alternate embodiments are described by way of example with reference to the accompanying drawings in which.

DETAILED DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
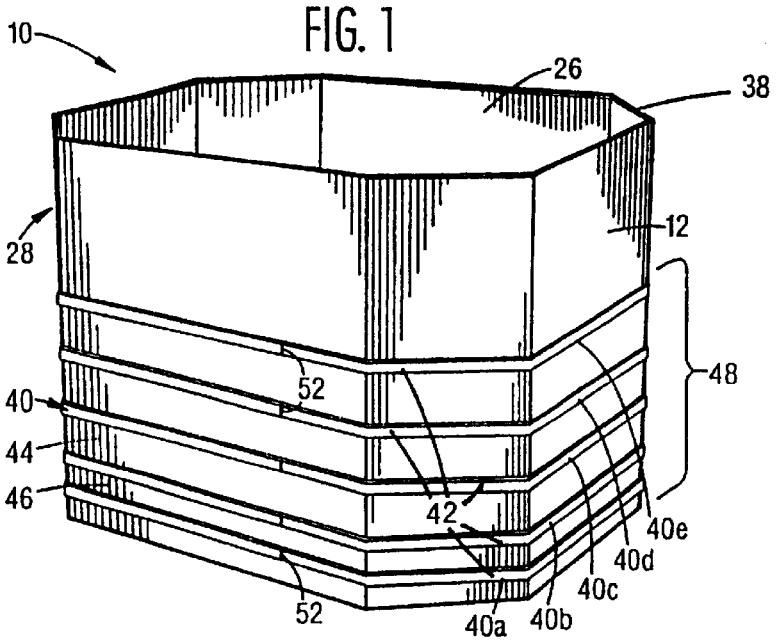
FIG. 1 is a perspective view of a reinforced corrugated paperboard container according to the present invention.
Figure 4:
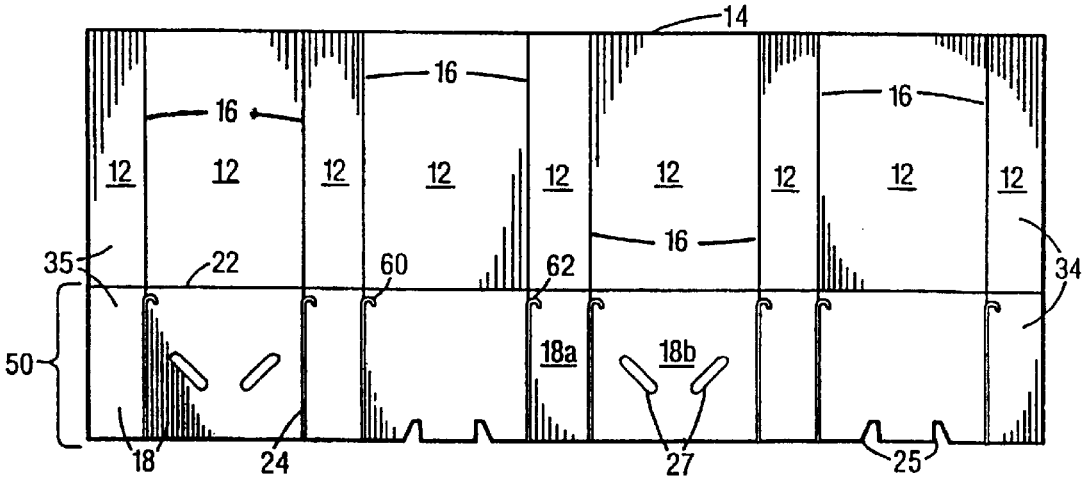
FIG. 4 is a plan view of a cutout paperboard blank forming an unassembled container prior to assembly to the flattened condition.
Figure 2:
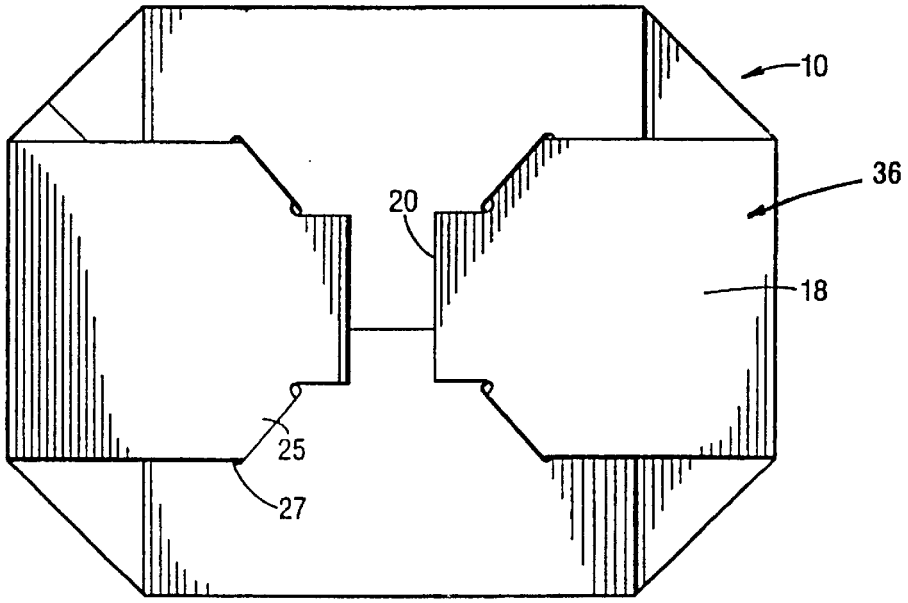
FIG. 2 is a bottom plan view of an erected container illustrating interlocking tabs and slots of folded flaps.
Figure 3:
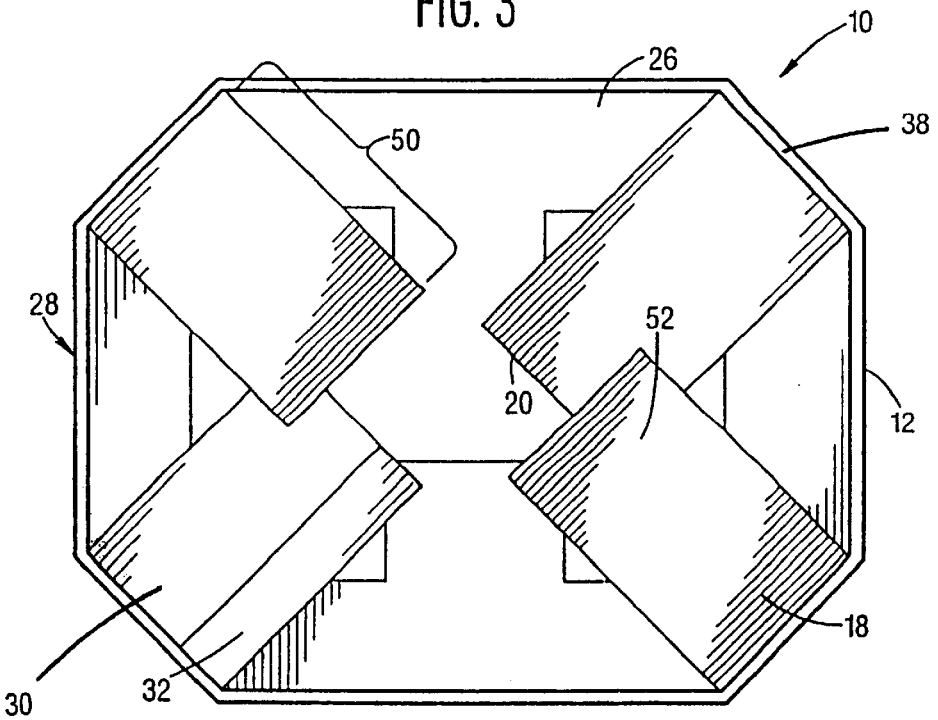
FIG. 3 is a top plan view of a container illustrating overlaying folded flaps within the container body for preventing container bottom wall gaps.
Figure 5A:
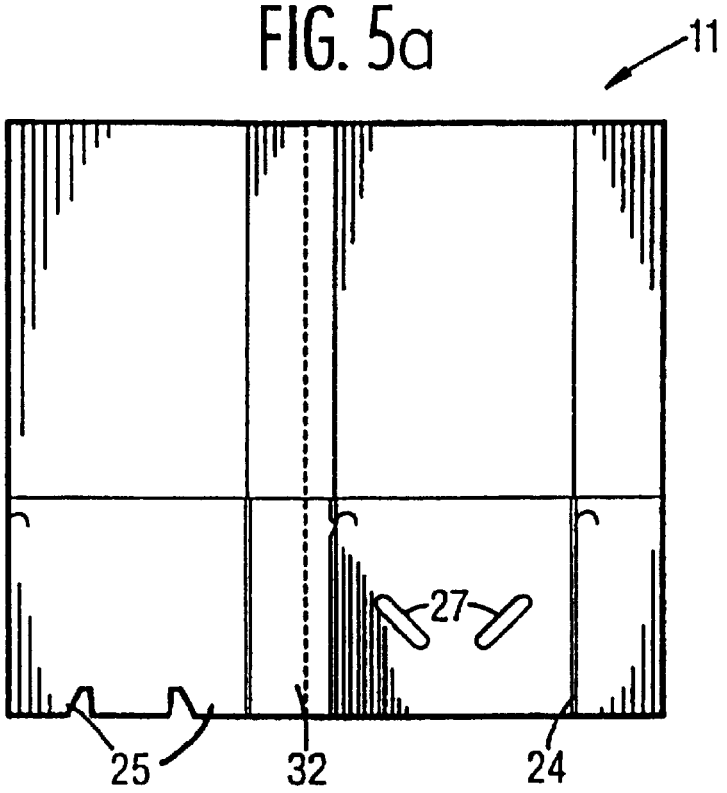
FIG. 5a is a side view of an unstrapped container in a flat arrangement.
Figure 5B:
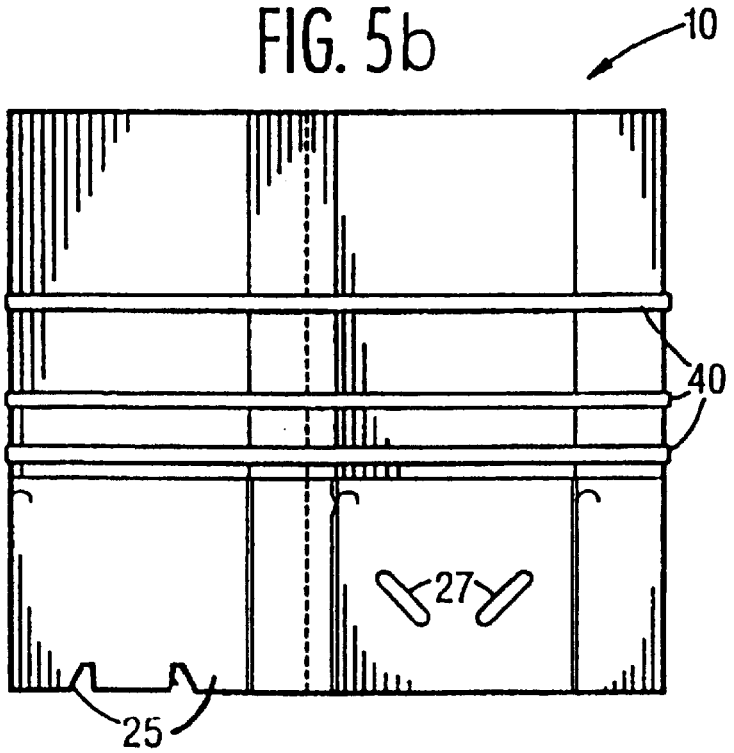
FIG. 5b is a side view of a strapped container in a flat condition.

Referring initially to FIG. 1–3, an embodiment of the present invention, a reinforced corrugated paperboard container 10 in accordance with the present invention comprises side wall panels 12 formed from a flat paperboard blank 14, as illustrated with reference to FIG. 4, scored to form the multiple side wall panels 12 joined to one another along adjacent edges 16. Each panel 12 has a flap 18 extending from an end 20 in prolongation of the panel 12. Each panel 12 is scored or creased at its juncture 22 with its associated flap 18. Adjacent flaps 18a, 18b, by way of example, are separated from one another by a slit 24, whereby the panels 12 and flaps 18 may be folded inwardly to one another for forming a hollow body 26 with the flaps 18 at the panel ends 20 overlaying one another, and flap tabs 25 inserted into cooperating slots 27, as illustrated with reference to FIGS. 2 and 3, and the panels 12 forming container body vertical side walls 28. As illustrated again with reference to FIG. 4, an end panel portion 30 includes glue to form a sealed glue joint 32 connecting end panels 34, 35 for forming a continuous panel arrangement of adjoining inwardly folded panels 12, as illustrated with reference to FIG. 5a of an unstrapped container 11 and FIG. 5b of a reinforced container 10 of the present invention, which will be described in further detail later in this section, have been applied. The joint 32 is approximately four inches wide in the preferred embodiment of the container 10 and vertically disposed when the container 10 is in an erected position as illustrated again with reference to FIG. 1. By way of example, the container 10 is shown with flaps 18 on a bottom side 36 and an open top side 38, as illustrated again with reference to FIGS. 1–3. It is anticipated that container embodiments having flaps forming both top and bottom sides will be used based on the need of the user.

Again with reference to FIG. 1, flexible plastic straps 40 for providing girth support when the container 10 is in an erected position are frictionally held in tension around the container vertical side walls 28. The girth support is provided by the horizontally placed straps 40 at longitudinally spaced locations 42 along the panels 12. Each location 42 has a greater separation 44 than a separation 46 from an adjacent lower location when the container 10 is in its erected position for providing a greater support at lower portions 48 of the container 12. By way of example, the container 12 illustrated again with reference to FIG. 1, has the lowest strap 40a positioned at two and one half inches from the bottom side 36, with additional straps 40b–40d separated by distances of three and one half, five, six, and eight inches respectively. Such separations 44. 46 will vary based on the container size and products being stored therein. Examples will be described later in this section.

In a preferred embodiment of the present invention, the container 10 is formed having eight sides panels 12 to provide an octagonal shape container 10. The octagonal container 10 has panels 12 and associated flaps 18 of varying width, as illustrated again with reference to FIGS. 2–4. The flaps 18 further having a length 50 for providing an overlap 52 when the container 10 is in the erected position, as illustrated again with reference to FIG. 3. In this way, gaps between typical container overlapping flaps are eliminated.

In a preferred embodiment of the invention, the straps 40 are polypropylene plastic or of a polyester-type material which are thermally fused or welded together at their ends 52 which secures the straps 40 in sufficient tension outside the container panels 12 for frictionally holding the straps to the container. Again, in the preferred embodiment, the plastic straps 40 include prestretched polypropylene straps, prestretched to provide a low elongation factor and preferably to reduce a typical stretching by approximately fifty percent. The straps 40 in the preferred embodiment of the present invention are of the low elongation type and have a breaking strength rating of 700 pounds per square inch. Further, the straps 40 used for the containers 10 herein described have a width ranging from ¼" to 2".

Figure 6A:
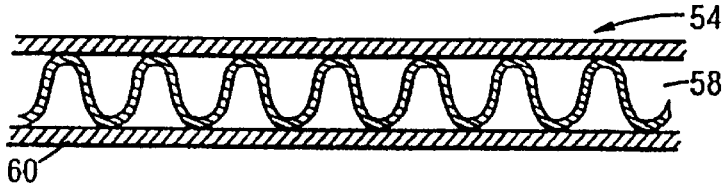
FIGS. 6a and 6b are partial cross sectional views illustrating single and double wall corrugated paperboard.
Figure 6B:
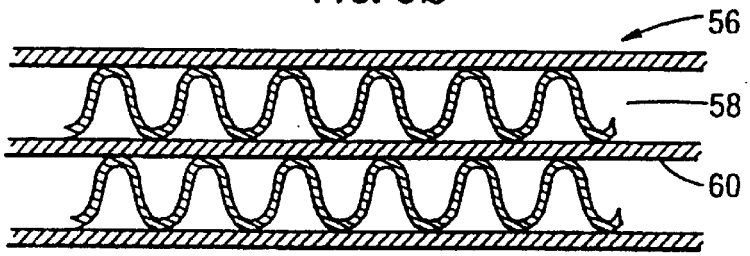

As illustrated with reference to FIGS. 6a and 6b, the container 10 is fabricated from single wall corrugated paperboard 54 and double wall corrugated paperboard 56. As illustrated, the single wall paper board comprises a corrugated medium or flute 58 sandwiched between two liners 60. Double wall paperboard 56 comprises three liners 60 and two flutes 58 as is known in the art. The present invention, permits the use of single and double wall paperboard for use in containers that typically require triple wall and multiple single wall laminated structures. In the preferred embodiment, the panels 12 are formed with the corrugations within the flute 58 positioned perpendicular to the straps 40.

Figure 7:
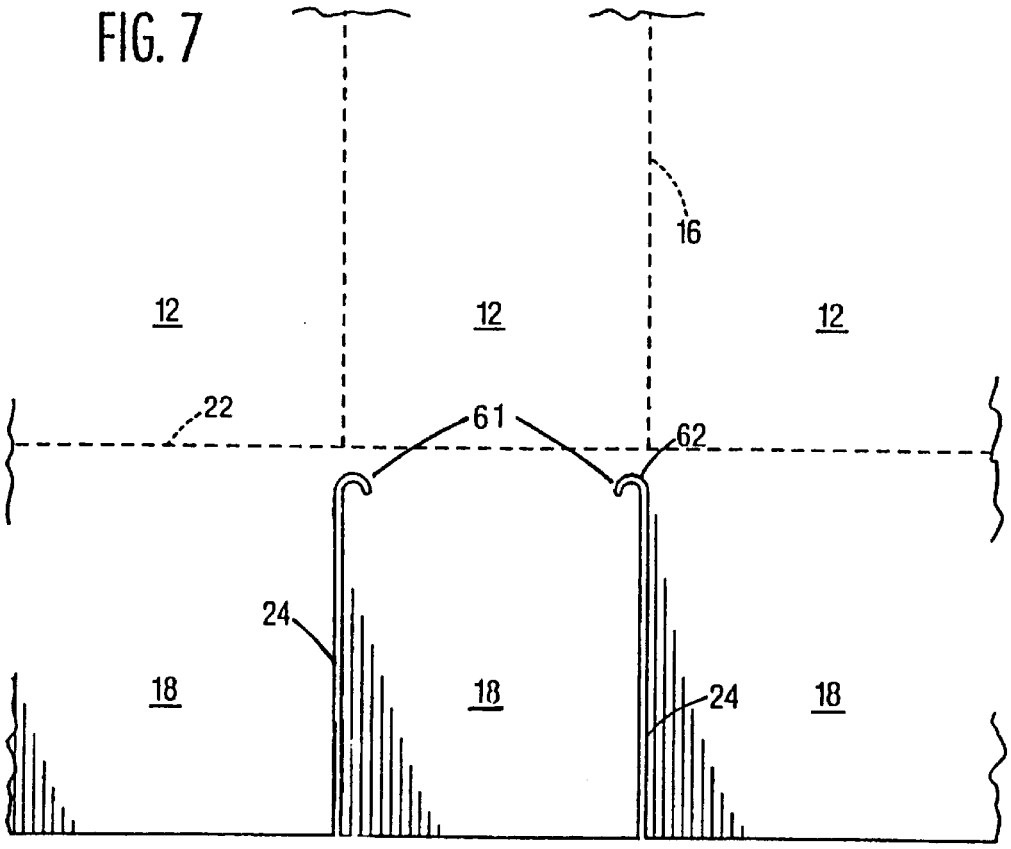
FIG. 7 is a partial plan view of a paperboard having score lines and slits of the present invention.

As illustrated again with reference to FIG. 5a and 5b, and as illustrated in the enlarged panel 12 and flap 18 view of FIG. 7, the slits 24 separating the flaps 18 terminate in a hook shape slit portion 61. Further, the hook shape slit portion 60 to is spaced from associated flap inward folds 22 as illustrated with numeral 62 in FIG. 7. In addition, a reverse five point score is used at the score line 22 to prevent slight fracturing of the score line 22 when flaps 18 are folded. This condition becomes evident primarily when using very heavy liners 60 such as a 90 pound liner(i.e. 90 pounds of fiber material per one thousand square feet of paperboard).

The strategic placement location of the straps 40 and number of straps depend on the product packed and the depth of container. Straps 40 are applied perpendicular to corrugation direction, as described, and the ends are secured by a heat seal, wherein the tension does not cause the container side panels 12 to bow yet with sufficient tension so that the straps 40 do not slide off during assembly of the container 10 to its erected condition.

By using a strapping machine for automatically prestrapping the container 10, proper and even tension is placed on each strap 40 versus strapping by hand which leads to misplacement; misalignment and uneven tension. Heat sealing or fusing the strap end 52 versus friction sealing or using buckles eliminates uncertainty and possible loss of a buckle when mixed in with the product being stored in the container 10. The present invention, eliminates the need for costly triple wall or laminated containers manufactured by relatively few companies. The addition of the prestretched 700 pound breaking strength strap 40 provides a bulge resistance typical of triple wall and laminated paperboard materials. The single and double wall paperboard 64, 56 can now be used and is more accessible in the marketplace. Further, there is greater bulge control with the 700 pound breaking strength prestretched straps 40 versus hand straps and sesame tape which is typically laminated between liners.

Figure 8:
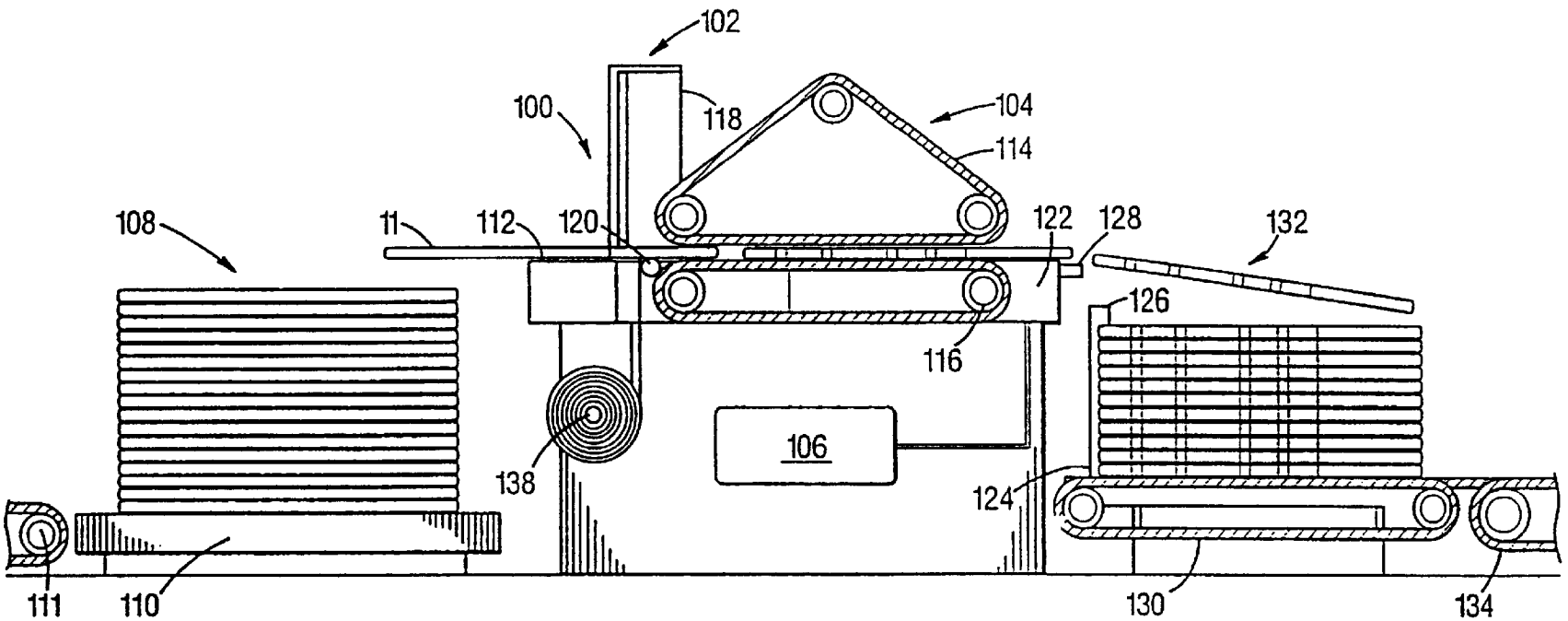
FIG. 8 is a partial side elevational view of a strapping apparatus of the present invention illustrating a strapping and conveying portion in cross-section.

An automatic container strapping apparatus 100 includes a strapping machine 102 and conveyor 104 which is controlled by a programmable controller 106. Unstrapped flattened containers 11, as described earlier with reference to FIG. 5a, are delivered in a stacked pelletized manner as illustrated by numeral 108 in FIG. 8 to the apparatus 100 for serial delivery of unstrapped flattened containers 11 to the strapping machine 102. The palletized container stack 108 is raised by a scissor lift 110 for positioning one unstrapped container 11 for movement onto the apparatus 100. A bulk loading conveyor 111 is used to deliver the palletized container stack 108 to the apparatus 100 for feeding the containers 11 into the operator controlled scissor lift 110 to assist in the feeding of one container at a time into the apparatus strapping machine 102. In the preferred embodiment, an operator manually positions the container 11 onto a receiving table 112 but it is anticipated that automatic feeding of individual containers 11 will be incorporated when a need arises. The apparatus 100 collects the unstrapped flattened containers 11 and installs the prestretched straps 40, earlier described and as illustrated again with reference to FIG. 5b, in tension around the flattened container 10 at the preselected incremental locations on the container side walls as earlier described. The conveyor 104 comprises a top conveyor belt 114 and a bottom belt 116 which cooperate to receive the unstrapped container 11 therebetween and pull the container 11 through a chute 118 of the strapping machine for installing the strap 40 at the preselected locations.

The operator feeds one container 11 at a time into the conveyor 104. The conveyor 104 is of the indexing belt conveyor type and is equipped with an electric eye 120 which initiates a strapping cycle. The cycle is controlled by a microprocessor of the controller 106 that is programmed to apply from one to as many straps 40 as may be required at the preselected locations on the container 10. The strap locations on the container and the strap separation pattern are predetermined and selected to meet various requirements.

The controller controls the conveyor drive system 122 through a magnetic clutch and brake drive motor. The belt conveyor 104 moves the unstrapped container 11 to each predetermined strap location and sends a signal to the strapping machine 102 to start the strapping cycle. The controller 106 uses a microprocessor and solid state circuitry with an easily accessible control panel and tension dial.

When all preselected straps have been applied to a now strapped or reinforced container 10, the programmed microprocessor of the controller 106 is programmed to increase the speed of the indexing conveyor 104 to an exit speed so as to reduce cycle time for strapping the next container 11. The increased exit speed of the conveyor 104 includes an added feature of permitting strapped containers 10 to be ejected from the apparatus 100 for convenient placement onto an awaiting platform 124 for stacking of the strapped flattened containers 10 and further packaging for shipment to the user.

The strapped container 10 exits onto the platform 124 of an automatic down stacker 126 using an electric eye height control 128. The down stacker 126 is further equipped with a powered conveyor 130 to remove a stacked unit 132 of typically from fifty to eighty containers 10 onto an exit conveyor 134. The stacked unit 132 is then fastened for shipment.

Figure 9:
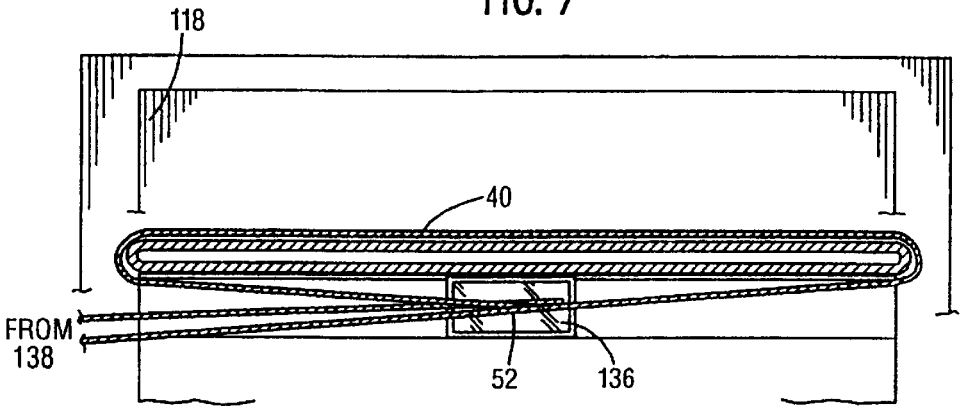
FIG. 9 is a partial cross-sectional view illustrating tensioning and sealing of a strap positioned around a container.
Figure 10:
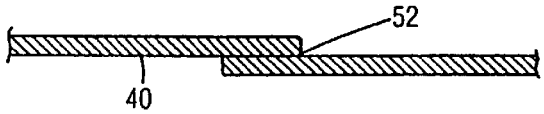
FIG. 10 is a partial side view of sealed strap end portions.

The strapping machine 102 comprises the chute 118 through which the unstrapped containers 11 pass. The chute opening in the preferred embodiment is approximately 81" wide by 16" high. The strapping machine 102 has a high speed strap feed system to reduce cycle time and a bottom strap sealer or welder 136 with strap tension control providing strap tension ranging from 10–120 lbs. One half inch wide strap 40 of low-elongation is used to reduce stretch under load and is supplied to the strapping machine from a bulk roll 138. Various colors are used to provide visual confirmation to the container user. Polypropylene strapping is used which has a 700 pound breaking strength rating. Standard polypropylene strapping will stretch by 18–20% while the low elongation will reduce stretch by 50%. The sealer 136 provides the tension, fuses the strap ends together, and cuts the strap from the bulk roll as schematically illustrated with reference to FIGS. 9 and 10. Strapping is then fed around the container through the chute 118 as is typical for strapping machines.

Single wall strapped containers with a special recyclable coating are used in a preferred embodiment of the container 10 which is fully recyclable and has the potential of eliminating double wall wax impregnated containers which are not recyclable and must be disposed of at landfills at great expense. Typically in the industry, double wall containers were required because of the need for bulge resistance, and wax impregnation was required to slow the process of moisture and water penetrating the fiber of the paper, thereby causing the corrugated paperboard to lose its rigidity.

By applying a recyclable coating to the paperboard, the process of moisture and water penetration is reduced, and the addition of the straps 40 with their nondeteriorating resistance to water offsets the change from a double wall to a single wall and wax to coating.

It is anticipated that a double wall pre-strapped container 10 will be used for double stacking when each container is holding 750–800 lbs. of product, a typical demand in the industry. It has been determined that the addition of strapping, in addition to adding bulge resistance adds sufficient top to bottom compression resistance to permit the stacking. Double stacking of containers typically has required either triple wall or laminated containers to provide adequate stacking strength. Using a double wall container 10 with very heavy liners 60 and heavy flute 58 weights, along with the addition of a pre-determined number of straps will provide the stacking strength required at a substantially lower cost.

It is anticipated that the Poultry Industry, with the need to ship chicken and turkey, MDM Meat, Breast Meat, Whole Birds, Frames and Bones, will benefit from the present invention. In addition, shippers in the Red Meat Industry, Pork Industry, Citrus Industry, and Produce Industry, and ICE Industry will also realize great benefit for such a reinforced container as herein described.

Figure 11:
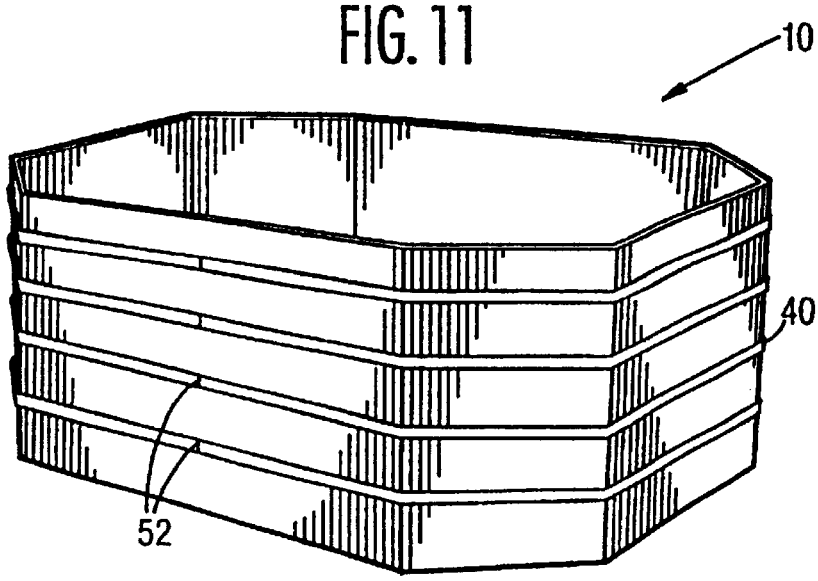
FIGS. 11 and 12 illustrate embodiments of alternate embodiments of strapped erected containers.
Figure 12:
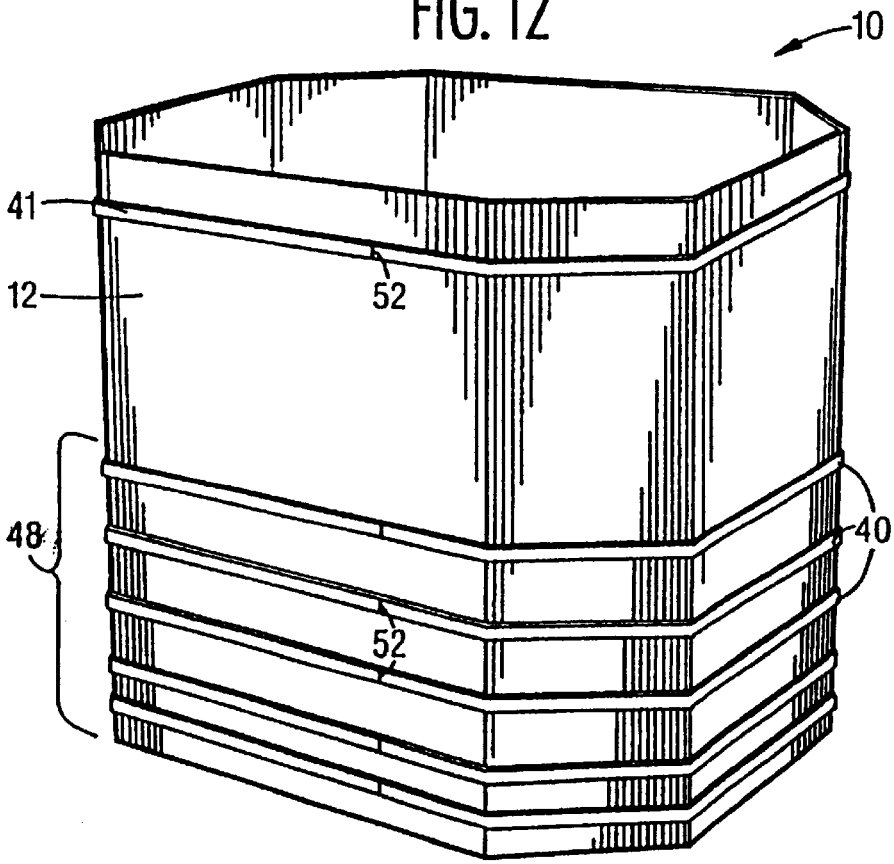

Technology and experience permits a determination of exact strap placement depending on the type of product being packaged and shipped. Although a vast amount of current users package product that tends to settle down into the container requiring more strapping towards the bottom, some product supports its own weight but bulges towards the outside evenly through the depth of the container. Citrus, melons and produce give this effect thereby requiring a more even distribution of straps 40 through the depth, as illustrated with reference to FIG. 11. As illustrated with reference to FIG. 12, the addition of a safety strap 41 proximate a top portion of the container aid in the stacking of the containers 10.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

What is claimed is:

1. A method for reinforcing a paperboard container moveable from a flattened condition to an erected condition, the method comprising the steps of:

providing a paperboard container having side wall panels and associated flaps held in a flattened condition;

providing a conveyor having opposing conveyor belts combining to sandwich the paperboard container therebetween for conveying the flattened container;

conveying the flattened container for attaching a strap around the container for providing girth support to the container when in an erected condition;

attaching a continuously formed strap under tension around an outside surface of the flattened container at a selected location;

incrementally advancing the flattened container to second and third selected locations, wherein a separation distance between the second and third selected locations is greater than the separation distance between the first and second selected locations; and attaching additional continuously formed straps at each of the second and third selected locations.

2. A method according to claim 1, wherein the strap attaching step includes the steps of:

wrapping a flexible strap around the container;

pulling opposing strap end for attaching the strap under tension around the container; and heat sealing the opposing strap ends for attaching the ends and thus placing the continuously formed strap under tension to the container.

3. A method according to claim 1, wherein the conveying step comprises the steps of:

operatively coupling a controller to the conveyor; and programming the controller for incrementally starting and stopping movement of the conveyor belts for advancing the container.

4. A method according to claim 1, further comprising the steps of:

sensing the flattened container for determining the strap selected location; and activating a strapping machine for the strap attaching step.

5. A method for reinforcing a paperboard container moveable from a flattened condition to an erected condition, the method comprising the steps of:

conveying the flattened paperboard container for placing a continuously formed strap around an outside surface of the container for providing girth support to the container when in an erected condition, the flattened container having side wall panels and associated flaps held in a flattened condition;

attaching a continuously formed strap under tension around the outside surface of the flattened container at a first selected location on the panels;

incrementally advancing the flattened container to second and third selected locations, wherein a separation distance between the second and third selected locations is greater than the separation distance between the first and second selected locations; and attaching additionally continuously formed straps at each of the second and third selected locations.

6. A method according to claim 5, wherein the conveying step comprises the step of loading the flattened container onto a conveyor having opposing conveyor belts combining to sandwich the flattened container therebetween for delivering the container to a position for completing the attaching steps.

7. A method according to claim 5 wherein the strap attaching steps include the steps of:

wrapping a flexible strap around the container;

pulling opposing strap end for attaching the strap under tension around the container; and welding the opposing strap ends for attaching the ends and thus the strap under tension to the container.

8. A method according to claim 5, wherein the incrementally advancing step comprises the steps of:

operatively coupling a controller with the conveyor for the incrementally advancing steps; and programming the controller for positioning the flattened container for the strap attaching steps.

9. A method according to claim 5, further comprising the step of sensing each of the selected locations the selected location for initiating the strap attaching step.

10. A method for reinforcing a container moveable from a flattened condition to an erected condition, the method comprising the steps of:

conveying a container in a flattened condition for placing a strap around side walls of the container for providing girth support thereto when the container is in an erected condition;

placing a first strap continuously formed under tension around an outside surface of the flattened container at a first location;

advancing the flattened container for placing a second strap; and placing a second continuously formed strap under tension around the outside surface of *the* flattened container at a second location, each of the first and second locations being only within a lower one half of the side wall panels of the container when the container is operating in the erected condition, thus providing girth support to the lower one half of the container.

11. A method according to claim 10, further comprising the steps of:

further advancing the flattened container for placing a third strap; and placing a third strap under tension around the flattened container at a third location, the third strap location being within the lower one half of the side wall panels of the container.

12. A method according to claim 10, wherein the strap placing steps include the steps of:

wrapping a flexible strap around the side walls of the container;

pulling opposing strap ends for placing the flexible strap under tension around the outer surface of the side walls of the container; and welding the opposing strap ends to each other for attaching the ends and thus placing the strap under tension around the outer surface of the side walls of the container.

13. A method for reinforcing a container having a corrugated side walls, the container moveable from a flattened condition to an erected condition, the method comprising the steps of:

folding the container along corrugations of the container for placing the container in a flattened position;

conveying the container in the flattened condition for placing a strap around an outside surface of side walls of the container for providing girth support thereto when the container is in an erected condition;

placing a first strap continuously formed under tension around the outside surface of flattened container at a first location, wherein the first strap is orientated perpendicular to the corrugations;

advancing the flattened container for placing a second strap; and placing a second strap under tension around the flattened container at a second location, wherein the second continuously formed strap is orientated perpendicular to the corrugations, each of the first and second locations being only within a lower one half of the side wall panels of the container when the container is operating in the erected condition, thus providing girth support to the lower one half of the container.

14. A method according to claim 13, further comprising the steps of further advancing the flattened container for placing a third strap; and placing a third strap under tension around the flattened container at a third location, wherein the strap is orientated perpendicular to the corrugations, the third strap location being within the lower one half of the side wall panels of the container.

15. A method according to claim 13, wherein the strap placing steps include the steps of:

wrapping a flexible strap around the side walls of the container;

pulling opposing strap ends for placing the flexible strap under tension around the outer surface of the side walls of the container; and welding the opposing strap ends to each other for attaching the ends and thus placing the strap under tension for frictionally attaching to the outer surface of the side walls of the container.

16. A method according to claim 10, wherein the container conveying step comprises the step of providing a conveyor having opposing conveyor belts combining to sandwich the flattened container therebetween for the conveying thereof.

17. A method according to claim 13, wherein the container conveying step comprises the step of providing a conveyor having opposing conveyor belts combining to sandwich the flattened container therebetween for the conveying thereof.

*18. A method according to claim 10, further comprising the steps of placing a third strap under tension around the flattened container at a third location, the third strap location being within the upper one half of the sidewall panels of the container.*

*19. The method recited in claim 18 further comprising the step of extending the third strap generally parallel with the first and second straps.*

*20. The method recited in claim 19 further comprising the step of spacing the third strap a greater distance from the next adjacent one of the first and second straps, than the distance between the first and second straps.*

*21. A method according to claim 11, further comprising the steps of placing a fourth strap under tension around the flattened container at a fourth location, the fourth strap location being within the upper one-half of the sidewall panels of the container.*

*22. A method according to claim 21 further comprising the step of extending the fourth strap around the flattened container generally parallel with the first, second and third straps.*

*23. A method according to claim 22, further comprising the step of spacing the fourth strap a greater dimension from the next adjacent straps, than the dimension between the first and second straps.*

*24. A method for fabricating a reinforced container, comprising the steps of:*

*providing a corrugated paperboard container having at least four walls with each wall having opposing edges, one edge of all of the walls defining a top side of the container when in an erected condition, all of the container walls having an opposing edge defining the bottom side of the container when in the erected condition;*

*disposing the container into a flattened condition;*

*placing a first, continuous strap around an outside surface of all of the walls of the container while in the flattened condition, the first strap located a first dimension from the edge of the walls defining the bottom side of the container;*

*placing a second, continuous strap around the outside surface of the walls of the flattened container, the second strap spaced from and extending generally parallel with the first strap at a dimension from the bottom edge of the flattened container which is greater than the first dimension represented by the first strap;*

*placing a third, continuous strap around the outside surface of the walls of the flattened container, the third strap extending generally parallel with the first and second straps and located a distance from the bottom edge of the flattened container which is greater than the first and second dimensions represented by the first and second straps, respectively;*

*placing a fourth, continuous strap around the outside surface of the walls of the flattened container, the fourth strap positioned at a fourth location the dimension of which is further from the bottom edge of the flattened container than the dimensions represented by the first, second and third straps, respectively; and*

*placing at least the first, second and third straps along the outside surface of the walls in that portion of the walls represented by the bottom one-half of the container when in the erected condition.*

*25. The method recited in claim 24 further comprising the step of placing a fifth, continuous strap around the outside surface of the walls of the flattened container, the fifth strap extending generally parallel with the first, second and third straps.*

*26. The method recited in claim 25 wherein the fifth strap is selectively placed in one of the upper one-half of the container in the erected condition, and the lower one-half of the container when in the erected condition.*

* * * * *